UNITED STATES PATENT OFFICE.

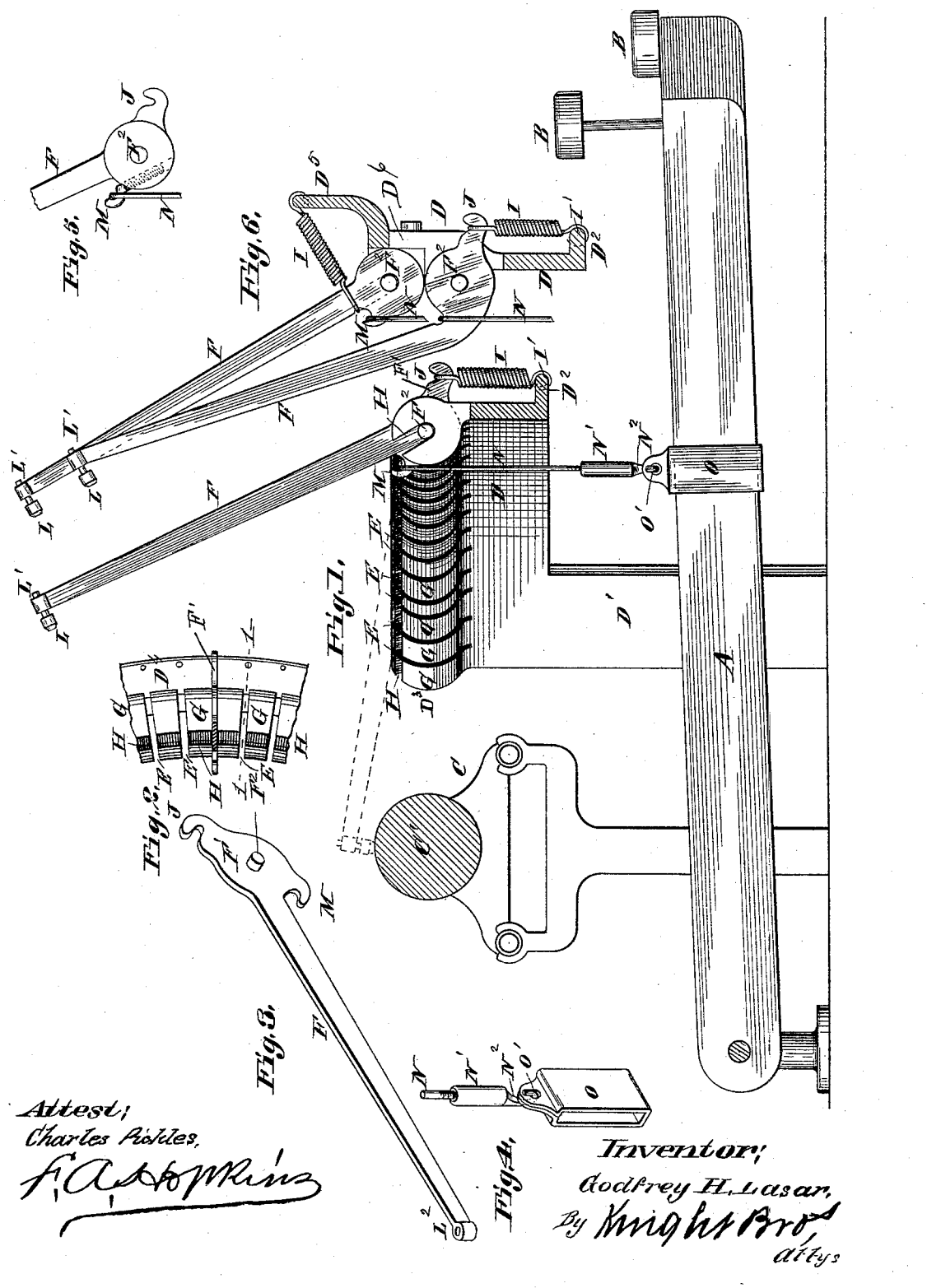

GODFREY H. LASAR, OF ST. LOUIS, MISSOURI.

TYPE-WRITING MACHINE.

SPECIFICATION forming part of Letters Patent No. 415,526, dated November 19, 1889.

Application filed October 11, 1886. Serial No. 215,907. (No model.)

*To all whom it may concern:*

Be it known that I, GODFREY H. LASAR, of the city of St. Louis, in the State of Missouri, have invented certain new and useful Improvements in Type-Writing Machines, of which the following is a full, clear, and exact description, reference being had to the accompanying drawings, forming part of this specification, and in which—

Figure 1 is a vertical longitudinal section through a machine having my improvement. Fig. 2 is a detail view of the type-lever segment or type-bar segment. Fig. 3 is an enlarged perspective view of one of the type-bars or type-levers. Fig. 4 is an enlarged perspective view illustrating the connection between the type-bar rods and the key-levers. Fig. 5 illustrates a modification of the type-bars or type-levers. Fig. 6 illustrates another modification, and shows two sets of key-levers secured to the segment.

This invention relates to certain improvements in type-writers wherein the type-levers or type-bars are arranged to move in a downward direction when printing; and it consists in features of novelty hereinafter fully described, and pointed out in the claims.

Referring to the drawings, A represents the key-levers of the machine; B, the keys thereof, and C the carriage, having a paper-roller C', as usual. Nothing new is claimed in these parts *per se*.

B represents a segment plate or bearing arranged across the key-levers, having end pieces D', by which it is supported and secured to the base of the machine, and saw-cuts or openings E in the top $D^3$, extending transversely thereof from front to rear entirely through the same to receive the parts F' of the type bars or levers F. The separated parts G of the top of the bearing or segment formed by the saw-cuts or openings $E^2$ have upwardly and inwardly inclined slots or openings, as shown at H, to receive the arbors or journals $F^2$ of the type-bars or type-levers, the slots H extending to near the center of the parts G, as shown in Fig. 1, and their lower ends forming the journal-bearing of the arbors $F^2$.

The type levers or bars are thin plates arranged to stand in an upwardly inwardly-inclined direction when in their normal position, and are thus held by springs H I, connected at one end to outer horns or projections J on the type-bars, and connected at their other end to a flange $D^2$ of the segment-plate at the base thereof, as shown at I'.

L represents the type secured to the outer ends of the bars or levers preferably by stems L' thereon entering holes or perforations $L^2$ in the ends of the bars or levers. The bars or levers are also provided with inner horns or projections M, into which are hooked the upper ends of rods N, the lower ends of which are screw-threaded to receive internally-screw-threaded sockets or nuts N', the lower ends of the sockets or nuts being provided with hooks $N^2$, integral therewith, to enter perforations O' in straps O, secured to the key-levers A. By simply depressing one of these bars or levers F, without depressing its key-lever, the rod N may be disengaged from the horn M, and by screwing it farther into or out of the sockets or nuts N' be lengthened or shortened to adjust the throw of the parts, and then may be rehooked onto the horn in the same manner in which it was unhooked. This provides a simple and cheap method of adjustment.

In Fig. 5 I have shown the horns M made of separate pieces from the rest of the bars or levers, and screwed into the parts F.

In Fig. 6 I have shown two sets of type bars or levers, and in this case the segment D would be provided with an upper segment-plate $D^6$, and two superposed sets of projections G, slotted to receive the arbors of the bars or levers, as shown by dotted lines, Fig. 6, and the upper segment-plate would also have an upwardly-extending flange $B^5$, to which the springs I of the upper levers would be connected.

I claim as my invention—

1. A type-bar F, constructed with the part F', oblique thereto, formed with journals $F^2$, upwardly-extending horn J, adapted to receive the sustaining-spring on one edge of the part F' of the type-bar, and upwardly-extending horn M, adapted to receive the pull-rod on the other edge of the part F' of the type-bar.

2. The combination of the type-bar bearing D, constructed with the top $D^3$, having the transverse openings E, extending from front to rear entirely through the top, forming the separated parts G, having slots H, the supporting end pieces D', and the horizontal flange $D^2$, the type-bar F, constructed with oblique part F', the journals $F^2$, upwardly-extending horn J on one edge of the oblique part of the type-bar spring I, connecting the horn with the horizontal flange, a key-lever, and a connection coupling the other edge of the type-bar with the key-lever.

GODFREY H. LASAR.

Witnesses:
SAML. KNIGHT,
GEO. H. KNIGHT.